United States Patent
Griffin et al.

(10) Patent No.: US 8,611,971 B2
(45) Date of Patent: *Dec. 17, 2013

(54) HINGING INTERCONNECTOR FOR A CLAMSHELL HANDHELD ELECTRONIC COMMUNICATION DEVICE

(75) Inventors: Jason T. Griffin, Kitchener (CA); Roman Rak, Waterloo (CA); Norman M. Ladouceur, Waterloo (CA)

(73) Assignee: BlackBerry Limited, Waterloo (CA)

( * ) Notice: Subject to any disclaimer, the term of this patent is extended or adjusted under 35 U.S.C. 154(b) by 604 days.

This patent is subject to a terminal disclaimer.

(21) Appl. No.: 12/016,570

(22) Filed: Jan. 18, 2008

(65) Prior Publication Data

US 2009/0186660 A1    Jul. 23, 2009

(51) Int. Cl.
  *H04M 1/00*    (2006.01)
(52) U.S. Cl.
  USPC .............. 455/575.3; 455/575.1; 455/550.1; 379/433.13
(58) Field of Classification Search
  USPC ............... 455/575.3, 566, 550.1, 575.1; 379/433.07, 433.13, 433.06; D14/338; 345/167, 161, 160; 16/225
  See application file for complete search history.

(56) References Cited

U.S. PATENT DOCUMENTS

| | | | |
|---|---|---|---|
| D307,012 S | 4/1990 | Berkheij | |
| D310,237 S | 8/1990 | Ohsawa et al. | |
| 5,185,790 A | 2/1993 | Mischneko | |
| 5,537,472 A | 7/1996 | Estevez-Alcolado et al. | |
| D382,820 S | 8/1997 | Chan | |
| 6,118,986 A | 9/2000 | Harris et al. | |
| 6,434,404 B1 | 8/2002 | Claxton et al. | |
| D467,891 S | 12/2002 | Tokioka et al. | |
| D484,918 S | 1/2004 | Okada et al. | |
| 6,775,560 B2 | 8/2004 | King et al. | |
| D496,636 S | 9/2004 | Lodato et al. | |
| D499,424 S | 12/2004 | Bahroocha | |
| D507,554 S | 7/2005 | Kim | |
| 6,934,568 B2 | 8/2005 | Charlier et al. | |
| 7,016,703 B2 | 3/2006 | Kishimoto et al. | |
| D525,230 S | 7/2006 | Kim et al. | |
| D539,772 S | 4/2007 | Park et al. | |
| 7,220,925 B2 * | 5/2007 | Kubo et al. | 200/5 A |
| D548,210 S | 8/2007 | Lewis | |
| D549,680 S | 8/2007 | Lee et al. | |

(Continued)

FOREIGN PATENT DOCUMENTS

| | | |
|---|---|---|
| EP | 1463273 A | 9/2004 |
| EP | 1583330 A | 10/2005 |

(Continued)

OTHER PUBLICATIONS

XP002401919 T-Mobile MDA—Last reviewed on Feb. 17, 2006, retrieved Oct. 4, 2006.

(Continued)

*Primary Examiner* — Nay A Maung
*Assistant Examiner* — Angelica M Perez
(74) *Attorney, Agent, or Firm* — Fitch, Even, Tabin & Flannery LLP

(57) ABSTRACT

A clamshell handheld wireless communication device having a hinging interconnector between the two housings, one in which the display screen is located and the other upon which the keyboard is located. The hinging interconnector is positioned between the two housings and navigation tool is located on the hinging interconnector.

18 Claims, 10 Drawing Sheets

(56) References Cited

U.S. PATENT DOCUMENTS

| | | | |
|---|---|---|---|
| 7,263,391 | B2 | 8/2007 | Sugiyama et al. |
| D551,200 | S | 9/2007 | Escorcia et al. |
| D561,719 | S | 2/2008 | Cho |
| D561,723 | S | 2/2008 | Kim et al. |
| D562,289 | S | 2/2008 | Suk et al. |
| D566,080 | S | 4/2008 | Kim et al. |
| D566,671 | S | 4/2008 | Lee |
| D570,319 | S | 6/2008 | Lee et al. |
| D571,344 | S | 6/2008 | Kim et al. |
| D584,268 | S | 1/2009 | Kim |
| 7,480,379 | B2 * | 1/2009 | Yoshikawa ............... 379/433.06 |
| 2003/0078077 | A1 | 4/2003 | Kokubo |
| 2003/0224739 | A1 | 12/2003 | Ikuta |
| 2004/0189597 | A1 | 9/2004 | Amitani et al. |
| 2006/0034601 | A1* | 2/2006 | Andersson et al. ........... 396/157 |
| 2006/0190836 | A1* | 8/2006 | Ling Su et al. ............... 715/773 |
| 2007/0015551 | A1 | 1/2007 | Iwama et al. |
| 2007/0054710 | A1 | 3/2007 | Pan |
| 2008/0293459 | A1 | 11/2008 | Wang |
| 2009/0186662 | A1* | 7/2009 | Rak et al. ................... 455/575.3 |
| 2009/0186670 | A1* | 7/2009 | Rak et al. ................... 455/575.3 |

FOREIGN PATENT DOCUMENTS

| | | |
|---|---|---|
| EP | 1614913 A | 1/2006 |
| EP | 1670218 A | 6/2006 |
| JP | 11/196167 A | 7/1999 |
| WO | 2004/013439 A | 2/2004 |
| WO | 2004/021685 A | 3/2004 |

OTHER PUBLICATIONS

NEC e808 telephone, announced 1st quarter 2003, [online], [site visited Jan. 19, 2009]. Available from internet, <URL: http://www.gsmarena.com>.

Samsung Serene telephone, announced Oct. 2005, [online], [site visited Jan. 19, 2009]. Available from Internet, <URL: http://www.gsmarena.com>.

NEC 910 telephone, announced 1st quarter 2004, [online], [site visited Jan. 19, 2009]. Available from Internet, <URL: http://www.gsmarena.com>.

i-mate JAQ telephone, announced Sep. 2006, [online], [site visited Jan. 19, 2009], Available from Internet, <URL: http:// www.gsmarena.com>.

Samsung D810 telephone, announced 1st quarter 2006, [online], [site visited Jan. 19, 2009], Available from Internet, <URL: http://www.gsmarena.com>.

Extended European Search Report dated Jun. 26, 2008. In corresponding application No. 08150413.6.

Examination Report dated Mar. 4, 2010. In corresponding application No. 08150413.6.

Examination Report dated Mar. 2, 2009. In corresponding application No. 08150413.6.

* cited by examiner

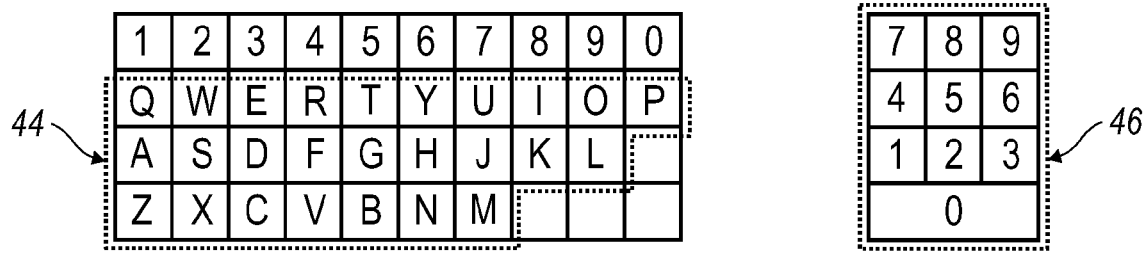
FIG. 4
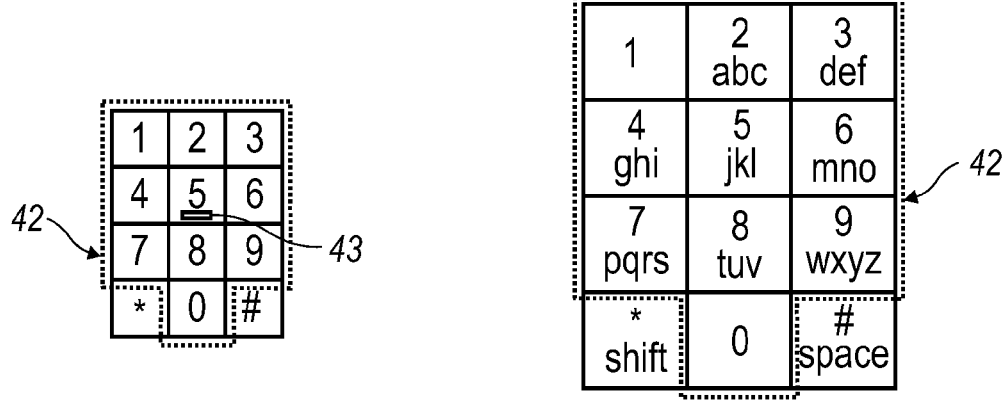
FIG. 5  FIG. 6

HINGING INTERCONNECTOR FOR A CLAMSHELL HANDHELD ELECTRONIC COMMUNICATION DEVICE

FIELD

This disclosure, in a broad sense, is directed toward a clamshell handheld communication device that has wireless communication capabilities and the networks within which the wireless communication device operates. The present disclosure further relates to a hinging interconnector for connecting a first housing to a second housing.

BACKGROUND

With the proliferation of wireless communication systems, compatible handheld communication devices are becoming more prevalent, as well as advanced. Whereas in the past such handheld communication devices were typically limited to either voice transmission (cell phones) or text transmission (pagers and PDAs), today's consumer often demands a multifunctional device capable of performing both types of transmissions, including even sending and receiving e-mail. Furthermore, these higher-performance devices can also be capable of sending and receiving other types of data including that which allows the viewing and use of Internet websites. These higher level functionalities necessarily require greater user interaction with the devices through included user interfaces (UIs) which may have originally been designed to accommodate making and receiving telephone calls and sending messages over a related Short Messaging Service (SMS). As might be expected, suppliers of such mobile communication devices and the related service providers are anxious to meet these customer requirements, but the demands of these more advanced functionalities have in many circumstances rendered the traditional user interfaces unsatisfactory, a situation that has caused designers to have to improve the UIs through which users input information and control these sophisticated operations.

Keyboards are used on many handheld devices, including telephones and mobile communication devices. The size of keyboards has been reduced over the years, as newer, smaller devices have become popular. Cell phones, for example, are now sized to fit in one's pocket or the palm of the hand. As the size of the devices has decreased, the more important it has become to utilize the entire keyboard surface as efficiently as possible.

Many keyboards on mobile devices have an input device for navigation through the graphical user interface. These interfaces include such devices as trackballs and rotating wheels which can be used to effect movement of a cursor or pointer, or to scroll up, down and about a displayed page. These navigation devices often occupy a relatively large amount of space on the incorporating mobile device. Because the navigation device is frequently used and often requires fine control, a lower end size limitation will normally be observed by device designers. To accommodate such larger, more convenient navigation devices on the housing of the mobile device, the amount of space that is available for the keys of the keyboard is correspondingly reduced if the keyboard and navigation device are proximately located to one another.

BRIEF DESCRIPTION OF THE DRAWINGS

Examplary methods and arrangements conducted and configured according to the advantageous solutions presented herein are depicted in the accompanying drawings wherein:

FIG. 4 illustrates a QWERTY keyboard layout paired with a traditional ten-key keyboard;

FIG. 5 illustrates ten digits comprising the numerals 0-9 arranged in a traditional, ITU Standard E.161 numeric telephone keypad layout, including the * and # keys flanking the 0 key;

FIG. 6 illustrates a traditional or standard phone key arrangement or layout according to the ITU Standard E.161 including both numerals and letters;

DETAILED DESCRIPTION

Figure 1:
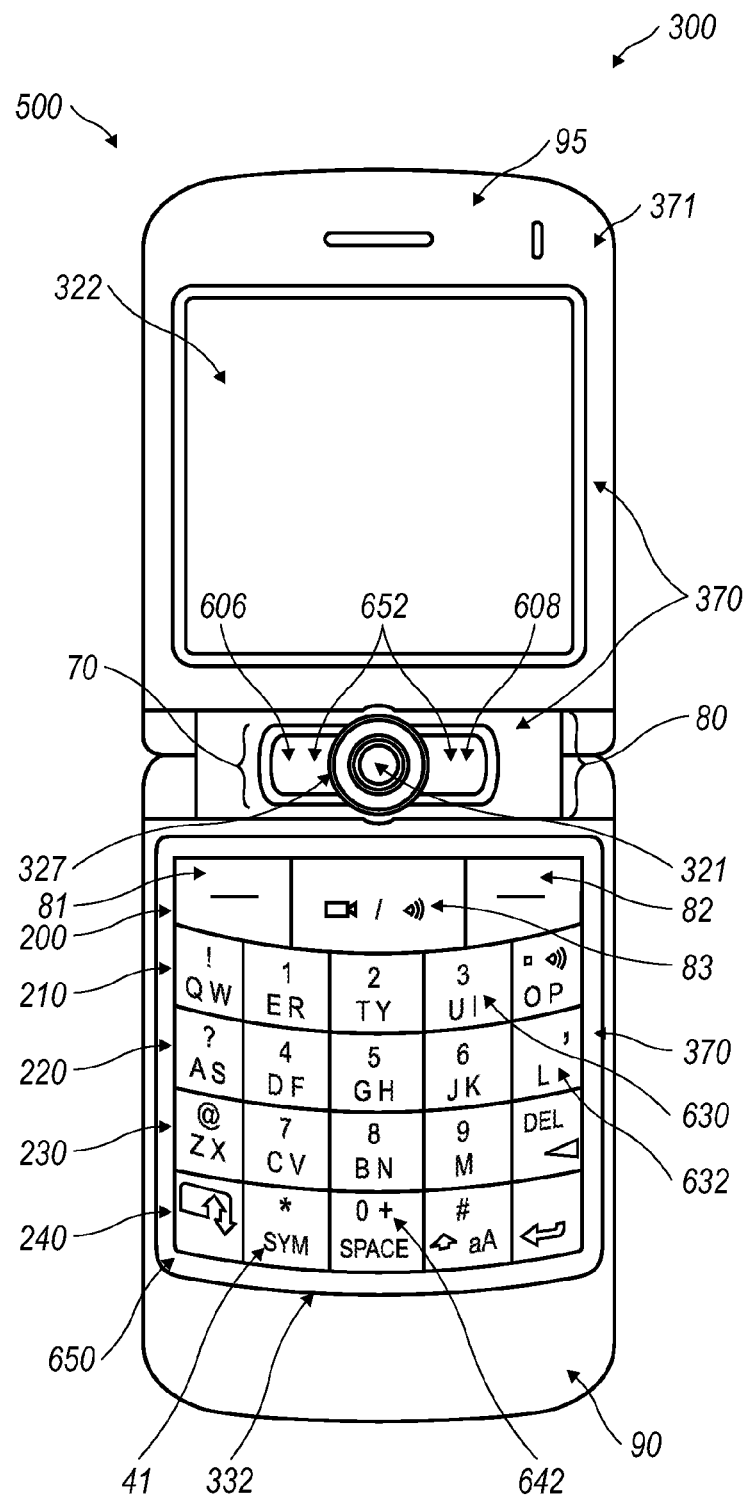
FIG. 1 illustrates a clamshell handheld wireless communication device with a trackball assembly, configured according to the present teachings, in an open configuration with a reduced keyboard and a hinging interconnector.
Figure 2:
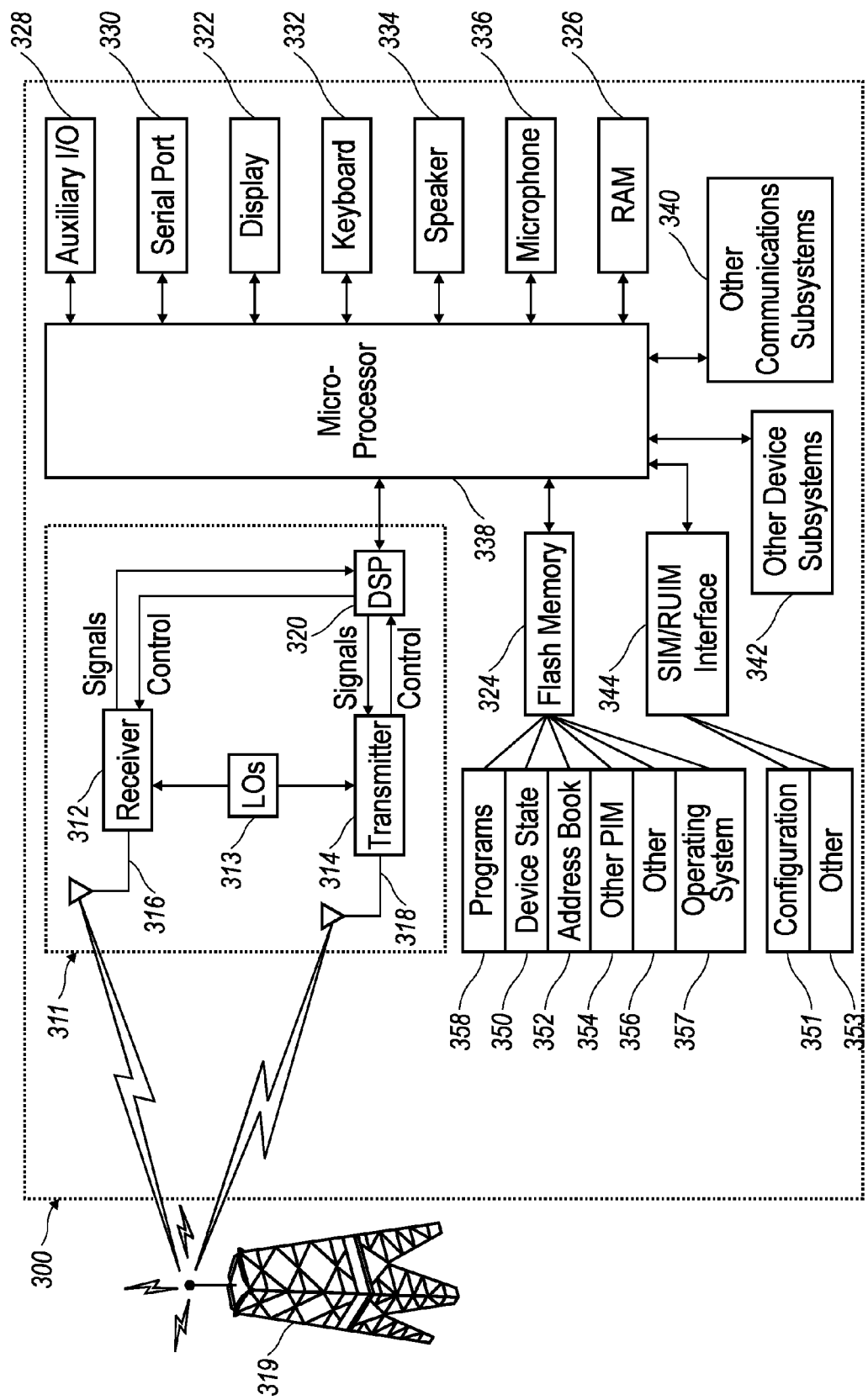
FIG. 2 is a block diagram representing a wireless handheld communication device interacting in a communication network.

An examplary handheld wireless communication device 300 is shown in FIG. 1, and the device's cooperation in a wireless network 319 is exemplified in the block diagram of FIG. 2. These figures are examplary only, and those persons skilled in the art will appreciate the additional elements and modifications necessary to make the device 300 work in particular network environments.

As shown in the block diagram of FIG. 2, the handheld device 300 includes a microprocessor 338 that controls the operation of the device 300. A communication subsystem 311 performs all communication transmission and reception with the wireless network 319. The microprocessor 338 further connects with an auxiliary input/output (I/O) subsystem 328, a serial port (preferably a Universal Serial Bus port) 330, a display 322, a keyboard 332, a speaker 334, a microphone 336, random access memory (RAM) 326, and flash memory 324. Other communication subsystems 340 and other device subsystems 342 are generally indicated as being functionally connected with the microprocessor 338 as well. An example of a communication subsystem 340 is that of a short range communication system such as BLUETOOTH® communication module or a Wi-Fi communication module (a communication module in compliance with IEEE 802.11b) and associated circuits and components. Additionally, the microprocessor 338 is able to perform operating system functions and preferably enables execution of software applications on the handheld wireless communication device 300.

The auxiliary I/O subsystem 328 can take the form of a variety of different navigation tools (multi-directional or single-directional) such as a navigation tool 327 with trackball 321 as illustrated in the examplary embodiment shown in FIG. 1, or a thumbwheel, a navigation pad, a joystick, or the like. These navigation tools are preferably located on the front surface of the handheld device 300 when in an open configuration 500 but may be located on any exterior surface of the handheld device 300. Other auxiliary I/O subsystems can include external display devices and externally connected keyboards (not shown). While the above examples have been provided in relation to the auxiliary I/O subsystem 328, other subsystems capable of providing input or receiving output from the handheld device 300 are considered within the scope of this disclosure. Additionally, other keys may be placed along the side of the handheld device 300 to function as escape keys, volume control keys 100, scrolling keys, power switches, or user programmable keys (105, 120), and may likewise be programmed accordingly.

As may be appreciated from FIG. 1, the handheld wireless communication device 300 comprises a lighted display 322 located above a keyboard 332 constituting a user input and suitable for accommodating textual input to the handheld wireless communication device 300. When the device is in the open configuration 500, the front face 370 has a navigation row 70 and a keypad 650 that includes alphanumeric keys 630, alphabetic keys 632, numeric keys 642, and other function keys 41 as shown in FIG. 1.

Keys, typically of a push-button or push-pad nature, perform well as data entry devices but present problems to the user when they must also be used to effect navigational control over a screen-cursor. In order to solve this problem the present handheld wireless communication device 300 preferably includes an auxiliary input that acts as a cursor navigation tool 327 and which is also located upon the front face 370 of the device 300 in the open configuration 500. While in the open configuration 500, the front face location 370 of the navigation tool 327 accommodates thumb-actuation similar to the keys of the keyboard 332. A particularly usable embodiment preferably provides the navigation tool 327 in the form of a trackball 321 which is easily utilized to instruct two-dimensional screen cursor movement in substantially any direction, as well as act as an actuator when the trackball 321 is depressed like a button. The placement of the navigation tool 327 is preferably above the keyboard 332 and below the display screen 322; here, it avoids interference during keyboarding and does not block the user's view of the display screen 322 during use. (See FIG. 1).

As illustrated in FIG. 1, the present disclosure is directed to a clamshell handheld wireless communication device 300 configured to send and receive text messages. The handheld device 300 includes a hand cradleable body 371 configured to be held in one hand by an operator of the device during text entry. A display 322 is included that is located on a front face 370 of the body 371 in the open configuration 500 and upon which information is displayed to the operator during text entry. A keypad 650 is also located on the front face 370 of the body 371 in the open configuration 500 and includes a plurality of keys. A navigation row 70 including menu keys 652 and a navigation tool 327 is also located on the front face 370 of the body 371 in the open configuration 500. The alphanumeric input keys 630 comprise a plurality of alphabetic and/or numeric keys (632, 642) having letters and/or numbers associated therewith. The order of the letters of the alphabetic keys 632 on the presently disclosed handheld device 300 can be described as being of a traditional, but non-ITU Standard E.161 layout. This terminology has been utilized to delineate the fact that such a telephone keypad as depicted in FIG. 6 may not allow for efficient text entry on the handheld device 300.

The clamshell handheld wireless communication device 300 is also configured to send and receive voice communications such as mobile telephone calls. To facilitate telephone calls, two call keys or outer keys (not shown) are provided in the navigation row 70 (so-called because it includes the navigation tool 327) at the outer ends of the navigation row 70. One of the two call keys is a call initiation key, and the other is a call termination key. The navigation row 70 also includes another pair of keys ("flanking keys" 606, 608) that are located immediately adjacent to the navigation tool 327, with one flanking key on either side of the navigation tool 327. It is noted that the outer keys are referred to as such not because they are necessarily the outermost keys in the navigation row—there may be additional keys located even further outwardly of the outer keys if desired—but rather because they are located outwardly with respect to the flanking keys (606, 608). The flanking keys (606, 608) may, for instance, constitute the menu keys 652, which include a menu call-up key 606 and an escape or back key 608. The menu call-up key 606 is used to bring up a menu on the display screen 322 and the escape key 608 is used to return to the previous screen or previous menu selection. The functions of the call keys and the menu keys may, of course, be provided by buttons that are located elsewhere on the handheld device 300, with different functions assigned to the outer keys and the flanking keys (606, 608).

Furthermore, the handheld device 300 is equipped with components to enable operation of various programs, as shown in FIG. 2. In an examplary embodiment, the flash memory 324 is enabled to provide a storage location for the operating system 357, device programs 358, and data. The operating system 357 is generally configured to manage other application programs 358 that are also stored in memory 324 and executable on the processor 338. The operating system 357 honors requests for services made by application programs 358 through predefined application program 358 interfaces. More specifically, the operating system 357 typically determines the order in which multiple applications 358 are executed on the processor 338 and the execution time allotted for each application 358, manages the sharing of memory 324 among multiple applications 358, handles input and output to and from other device subsystems 342, and so on. In addition, users can typically interact directly with the operating system 357 through a user interface, which can include the keyboard 332 and display screen 322. While in an examplary embodiment the operating system 357 is stored in flash memory 324, the operating system 357 in other embodiments is stored in read-only memory (ROM) or similar storage element (not shown). As those skilled in the art will appreciate, the operating system 357, device application 358 or parts thereof may be loaded in RAM 326 or other volatile memory.

In one examplary embodiment, the flash memory 324 contains programs/applications 358 for execution on the handheld device 300 including an address book 352, a personal information manager (PIM) 354, and the device state 350. Furthermore, programs 358 and other information 356 including data can be segregated upon storage in the flash memory 324 of the handheld device 300.

When the handheld device 300 is enabled for two-way communication within the wireless communication network 319, it can send and receive signals from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, and the Code Division Multiple Access (CDMA) network and those networks, generally described as packet-switched, narrowband, data-only technologies which are mainly used for short burst wireless data transfer. For the systems listed above, the handheld wireless communication device 300 must be properly enabled to transmit and receive signals from the communication network 319. Other systems may not require such identifying information. GPRS, UMTS, and EDGE require the use of a Subscriber Identity Module (SIM) in order to allow communication with the communication network 319. Likewise, most CDMA systems require the use of a Removable Identity Module (RUIM) in order to communicate with the CDMA network. The RUIM and SIM card can be used in multiple different communication devices 300. The handheld communication device 300 may be able to operate some features without a SIM/RUIM card, but it will not be able to communicate with the network 319. A SIM/RUIM interface 344 located within the device 300 allows for removal or insertion of a SIM/RUIM card (not shown). The SIM/RUIM card features memory and holds key configurations 351, and other information 353 such as identification and subscriber related information. With a properly enabled communication device 300, two-way communication between the handheld wireless communication device 300 and communication network 319 is possible.

If the handheld wireless communication device 300 is enabled as described above or the communication network 319 does not require such enablement, the two-way communication enabled handheld device 300 is able to both transmit and receive information from the communication network 319. The transfer of communication can be from the handheld device 300 or to the device 300. In order to communicate with the communication network 319, the handheld device 300 in the presently described examplary embodiment is equipped with an integral or internal antenna 318 for transmitting signals to the communication network 319. Likewise the handheld wireless communication device 300 in the presently described examplary embodiment is equipped with another antenna 316 for receiving communication from the communication network 319. These antennae (316, 318) in another examplary embodiment are combined into a single antenna (not shown). As one skilled in the art would appreciate, the antenna or antennae (316, 318) in another embodiment are externally mounted on the handheld device 300.

When equipped for two-way communication, the handheld wireless communication device 300 features a communication subsystem 311. As is well known in the art, this communication subsystem 311 is modified so that it can support the operational needs of the handheld device 300. The subsystem 311 includes a transmitter 314 and receiver 312 including the associated antenna or antennae (316, 318) as described above, local oscillators (LOs) 313, and a processing module 320 which in the presently described examplary embodiment is a digital signal processor (DSP) 320.

It is contemplated that communication by the handheld device 300 with the wireless network 319 can be any type of communication that both the wireless network 319 and handheld device 300 are enabled to transmit, receive and process. In general, these can be classified as voice and data. Voice communication is communication in which signals for audible sounds are transmitted by the handheld device 300 through the communication network 319. Data is all other types of communication that the handheld device 300 is capable of performing within the constraints of the wireless network 319.

Example device applications that can depend on such data include email, contacts and calendars. For each such application synchronization with home-based versions on the applications can be critical for either or both of their long term and short term utility. As an example, emails are often time sensitive, so substantially real time synchronization is highly desirable. Contacts, on the other hand, can be usually updated less frequently without inconvenience. Therefore, the utility of the handheld device 300 is significantly enhanced when connectable within a communication system, and particularly when connectable on a wireless basis in a network 319 in which voice, text messaging, and other data transfer are accommodated.

As intimated hereinabove, one of the more important aspects of the handheld wireless communication device 300 to which this disclosure is directed is its size. While some users will grasp the handheld device 300 in both hands, it is intended that a predominance of users will cradle the handheld device 300 in one hand in such a manner that input and control over the handheld device 300 can be effected using the thumb of the same hand in which the handheld device 300 is held. However, it is appreciated that additional control can be effected by using both hands. As a handheld device 300 that is easy to grasp and desirably pocketable, the size of the handheld device 300 must be kept commensurately small. Of the device's dimensions, limiting its width is important for the purpose of assuring cradleability in a user's hand. Moreover, it is preferred that the width of the handheld device 300 be maintained at less than eight centimeters (approximately three inches). Keeping the handheld device 300 within these dimensional limits provides a hand cradleable unit that users prefer for its usability and portability. Limitations with respect to the height (length) of the handheld device 300 are less stringent when considering hand-cradleability. Therefore, in order to gain greater size, the handheld device 300 can be elongated so that its height is greater than its width, but still remains easily supported and operated in one hand.

A potential drawback is presented by the small size of the handheld device 300 in that there is limited exterior surface area for the inclusion of user input and device output features. This is especially true for the "prime real estate" on the front face 370 of the handheld device 300 in the open configuration 500, where it is most advantageous to include a display screen 322 that outputs information to the user. The display screen 322 is preferably located above a keyboard 332 that is utilized for data entry into the handheld device 300 by the user. If the screen 322 is provided below the keyboard 332, a problem occurs in that viewing the screen 322 is inhibited when the user is inputting data using the keyboard 332. Therefore it is preferred that the display screen 322 be above the input area, thereby solving the problem by assuring that the hands and fingers do not block the view of the screen 322 during data entry periods.

To facilitate textual data entry into the handheld device 300, an alphabetic keyboard 332 is provided. In the examplary illustrated embodiment, a full alphabetic keyboard 332 is utilized in which there is one key per letter (with some of the letter keys also having numbers, symbols, or functions associated with them). In this regard, the associated letters can be organized in QWERTY, QWERTZ, AZERTY, or Dvorak layout, among others, thereby capitalizing on certain users' familiarity with these various letter orders. In order to stay within the bounds of the limited front surface area, however, each of the keys must be commensurately small when, for example, twenty-six keys must be provided in the instance of the English language.

FIG. 1 illustrates an embodiment of the clamshell handheld wireless communication device 300 in an open configuration 500. The handheld device 300 is provided with a keyboard 332 to enter text data and place telephone calls and a display screen 322 for communicating information to the user. A connect/send key (not shown) is preferably provided to aid in the placement of a phone call. Additionally, a disconnect/end key (not shown) is preferably provided. The send key and end key preferably are arranged in the navigation row 70 including the navigation tool 327. Additionally, the navigation row 70 preferably has a menu call-up key 606 and a back key or escape key 608.

The keyboard 332 includes a plurality of keys that can be of a physical nature such as actuable buttons, or they can be of a software nature, typically constituted by virtual representations of physical keys on a display screen 322 (referred to herein as "virtual keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space. Input commands and functions can include such things as delete, backspace, moving a cursor up, down, left or right, initiating an arithmetic function or command, initiating a command or function specific to an application program or feature in use, initiating a command or function programmed by the user and other such commands and functions that are well known to those persons skilled in the art. Specific keys or other types of input devices can be used to navigate through the various applications and features thereof. Further, depending on the application 358 or feature in use, specific keys can be enabled or disabled.

In the case of physical keys, all or a portion of the plurality of keys have one or more indicia representing character(s), command(s), and/or functions(s) displayed at their top surface and/or on the surface of the area adjacent the respective key. In the instance where the indicia of a key's function is provided adjacent the key, the indicia can be printed on the device cover beside the key, or in the instance of keys located adjacent the display screen 322. Additionally, current indicia for the key may be temporarily shown nearby the key on the display screen 322.

In the case of virtual keys, the indicia for the respective keys are shown on the display screen 322, which in one embodiment is enabled by touching the display screen 322, for example, with a stylus to generate the character or activate the indicated command or function. Some examples of display screens 322 capable of detecting a touch include resistive, capacitive, projected capacitive, infrared and surface acoustic wave (SAW) touchscreens.

Physical and virtual keys can be combined in many different ways as appreciated by those skilled in the art. In one embodiment, physical and virtual keys are combined such that the plurality of enabled keys for a particular application or feature of the handheld wireless communication device 300 is shown on the display screen 322 in the same configuration as the physical keys. Using this configuration, the user can select the appropriate physical key corresponding to what is shown on the display screen 322. Thus, the desired character, command or function is obtained by depressing the physical key corresponding to the character, command or function displayed at a corresponding position on the display screen 322, rather than touching the display screen 322.

Figure 3A:
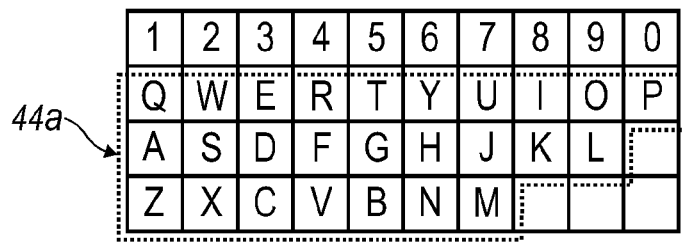
FIG. 3A illustrates an examplary QWERTY keyboard layout.
Figure 3B:
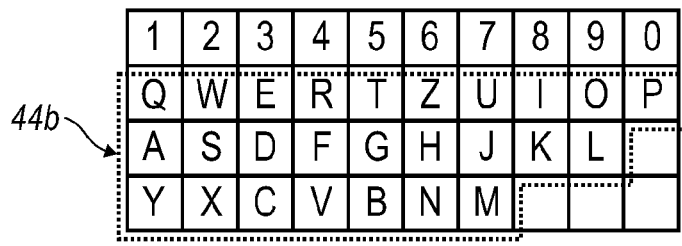
FIG. 3B illustrates an examplary QWERTZ keyboard layout.
Figure 3C:
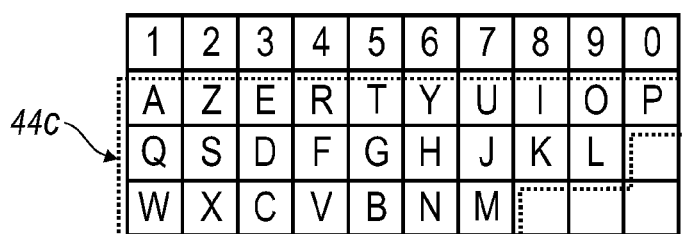
FIG. 3C illustrates an examplary AZERTY keyboard layout.
Figure 3D:
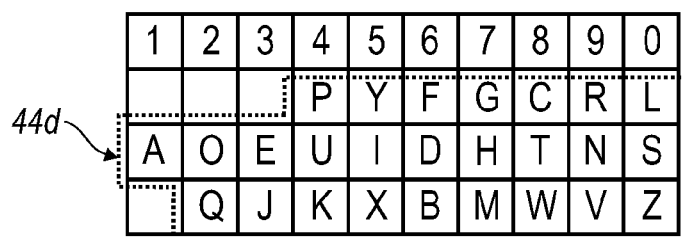
FIG. 3D illustrates an examplary Dvorak keyboard layout.

The various characters, commands, and functions associated with keyboard typing in general are traditionally arranged using various conventions. The most common of these in the United States, for instance, is the QWERTY keyboard layout. Others include the QWERTZ, AZERTY, and Dvorak keyboard configurations. The QWERTY keyboard layout is the standard English-language alphabetic key arrangement 44a shown in FIG. 3A. The QWERTZ keyboard layout is normally used in German-speaking regions; this alphabetic key arrangement 44b is shown in FIG. 3B. The AZERTY keyboard layout 44c is normally used in French-speaking regions and is shown in FIG. 3C. The Dvorak keyboard layout was designed to allow typists to type faster; this alphabetic key arrangement 44d is shown in FIG. 3D. In other examplary embodiments, keyboards having multi-language key arrangements can be implemented.

Figure 11:
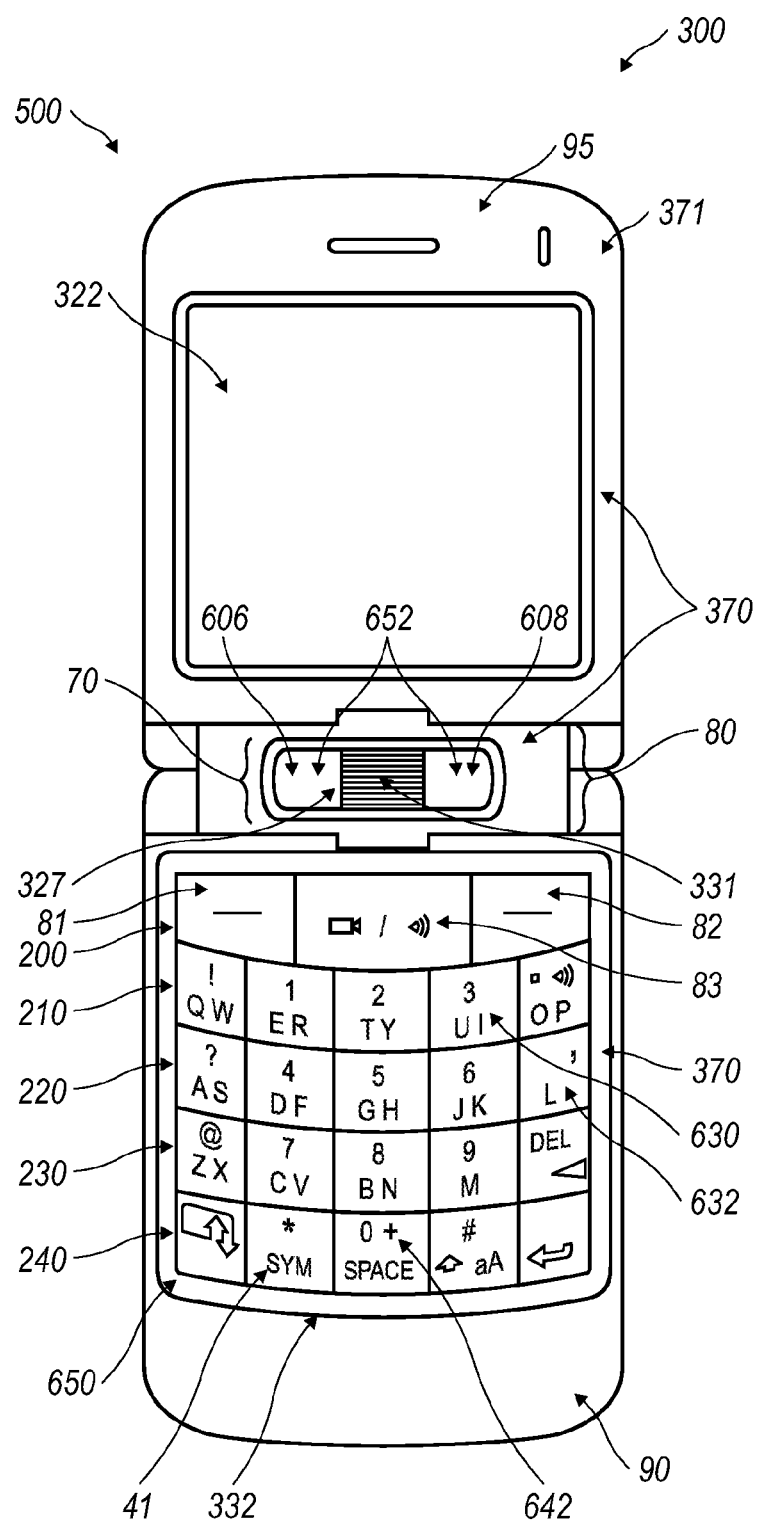
FIG. 11 illustrates a clamshell handheld wireless communication device with a roller-barrel, configured according to the present teachings, in an open configuration with a reduced keyboard and a hinging interconnector.
Figure 12:
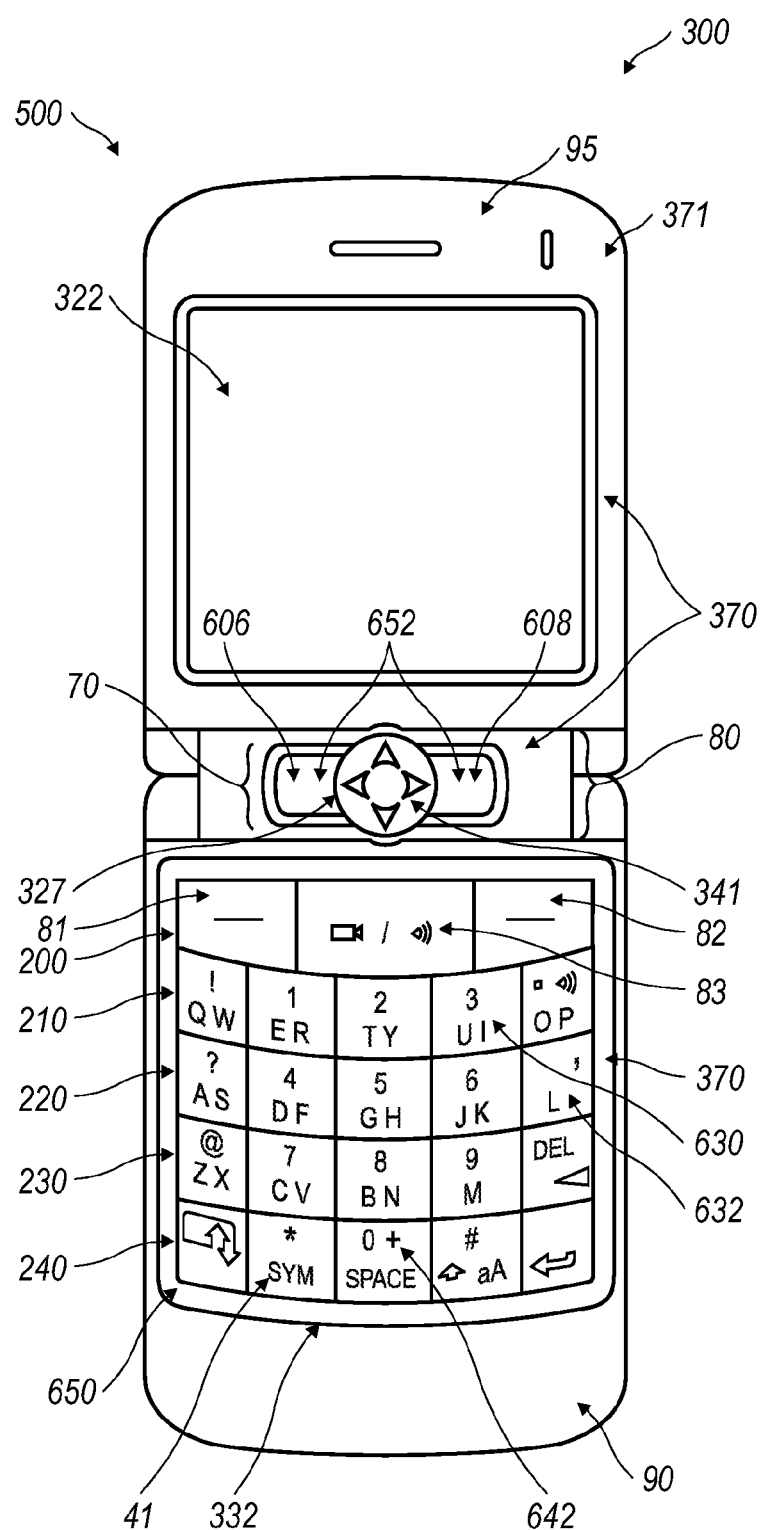
FIG. 12 illustrates a clamshell handheld wireless communication device with a four-way keypad, configured according to the present teachings, in an open configuration with a reduced keyboard and a hinging interconnector

Alphabetic key arrangements are often presented along with numeric key arrangements. Typically, the numbers 1-9 and 0 are positioned in the row above the alphabetic keys 44a-d, as shown in FIG. 3A-D. Alternatively, the numbers share keys with the alphabetic characters, such as the top row of the QWERTY keyboard. Yet another exemplary numeric key arrangement is shown in FIG. 4, where a "ten-key" style numeric keypad 46 is provided on a separate set of keys that is spaced from the alphabetic/numeric key arrangement 44. Still further, ten-key numeric arrangements may be common with or shared with a subset of the alphabetic keys, as best shown in FIGS. 11 and 12. The ten-key styled numeric keypad 46 includes the numbers "7", "8", "9" arranged in a top row, "4", "5", "6" arranged in a second row, "1", "2", "3" arranged in a third row, and "0" in a bottom row. Further, a numeric phone key arrangement 42 is exemplarily illustrated in FIG. 5.

As shown in FIG. 5, the numeric phone key arrangement 42 may also utilize a surface treatment on the surface of the center "5" key. This surface treatment is configured such that the top surface of the key is distinctive from the surface of other keys. Preferably the surface treatment is in the form of a raised bump or recessed dimple 43. Alternatively, raised bumps may be positioned on the housing around the "5" key and do not necessarily have to be positioned directly on the key.

It is desirable for handheld devices 300 to include a combined text-entry keyboard and a telephony keyboard. Examples of such handheld devices 300 include mobile stations, cellular telephones, wireless personal digital assistants (PDAs), two-way paging devices, and others. Various keyboards are used with such devices and can be termed a full keyboard, a reduced-format keyboard, or phone key pad. In embodiments of a handheld device 300 having a full keyboard, the alphabetic characters are singly associated with the plurality of physical keys. Thus, in an English-language keyboard of this configuration, there are at least 26 keys in the plurality, with one letter per alphabetic key.

FIGS. 5 and 6 both feature numeric keys arranged according to the ITU Standard E.161 form. In addition, FIG. 6 also incorporates alphabetic characters according to the ITU Standard E.161 layout as well.

Figure 7:
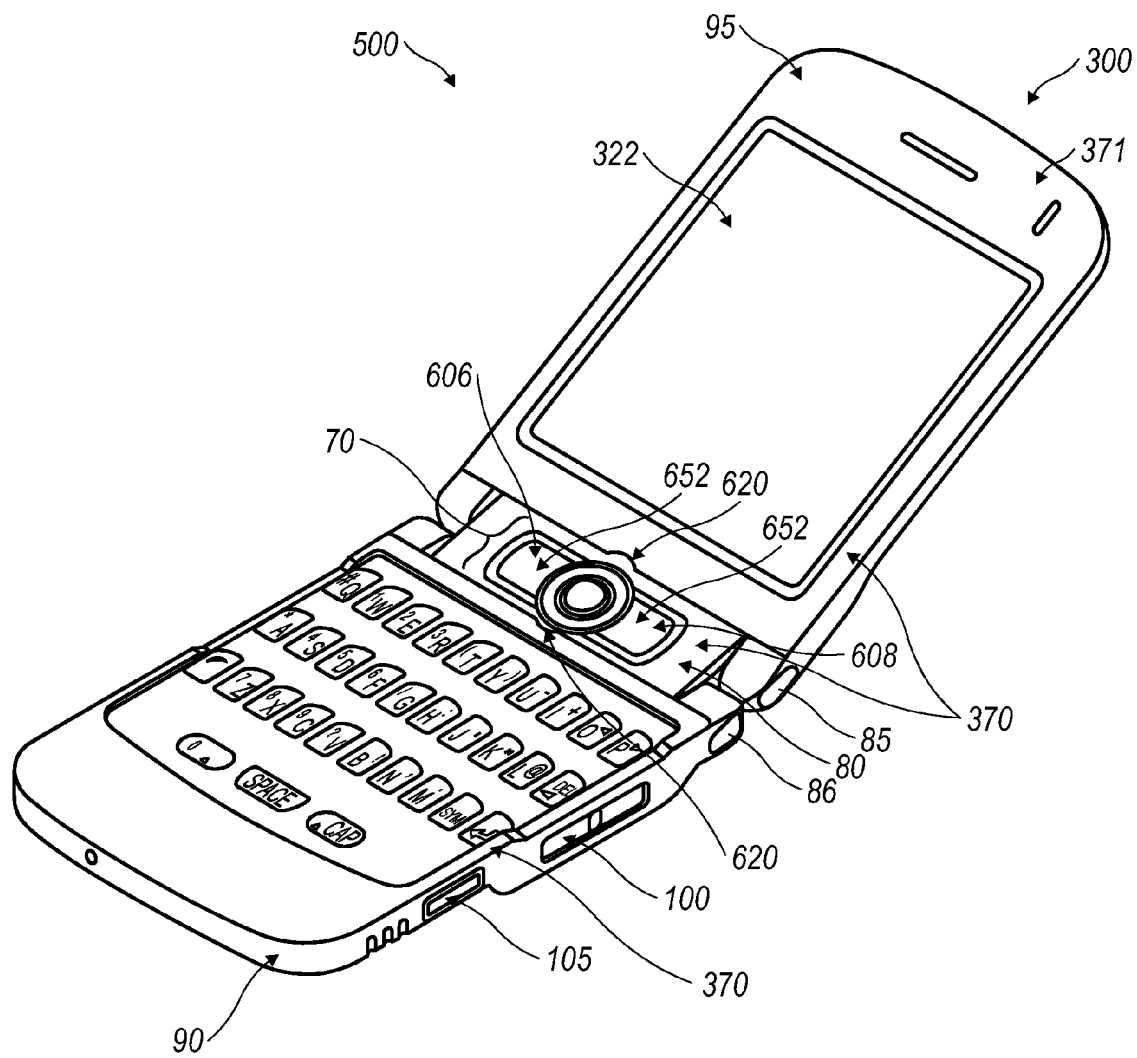
FIG. 7 illustrates a front perspective view of a clamshell handheld wireless communication device, according to the present teachings, in an open configuration with a full keyboard and hinging interconnector.

Reference is now made to FIG. 7, which discloses an examplary embodiment having a full alphabetic keyboard arrangement. In particular, as shown in FIG. 7, only one letter of the alphabet is associated with any given alphabetic key within the keys of the keypad 650. This is in contrast to reduced-format arrangements (as shown in FIG. 1), in which multiple letters of the alphabet may be associated with at least some of the alphabetic keys of a keyboard 332. Additionally, as alluded to above and shown in the referenced figures, some of the alphabetic keys also have numbers, symbols, or functions associated with them. In the specifically illustrated embodiment, the alphabetic keys (including those also having numbers, symbols, or functions associated with them) are arranged in a QWERTY arrangement, although any of the other full-keyboard arrangements (QWERTZ, AZERTY, or Dvorak) may also be implemented within the scope of this disclosure.

As described above, the International Telecommunications Union ("ITU") has established phone standards for the arrangement of alphanumeric keys. The standard phone numeric key arrangement shown in FIGS. 5 (no alphabetic letters) and 6 (with alphabetic letters) corresponds to ITU Standard E.161, entitled "Arrangement of Digits, Letters, and Symbols on Telephones and Other Devices That Can Be Used for Gaining Access to a Telephone Network." This standard is also known as ANSI TI.703-1995/1999 and ISO/IEC 9995-8:1994. As shown in FIG. 1, the numeric key arrangement can be overlaid on a QWERTY arrangement. The numeric arrangement as shown can be aptly described as a top-to-bottom ascending order three-by-three-over-zero pattern.

While several keyboard layouts have been described above, the layouts can be described as having keys disposed on the keyboard in a QWERTY, reduced QWERTY, QWERTZ, Dvorak, or AZERTY key layout. These familiar keyboard layouts allow users to type more intuitively and quickly than, for example, on the standard alphabetic layout on a telephone pad. As mentioned above, the key arrangements can be reduced compared to a standard layout through the use of more than one letter or character per key. By utilizing fewer keys, the keys can be made larger and therefore more convenient to the user.

In at least one embodiment, a handheld wireless communication device 300 that is configured to send and receive email text messages comprises a hand cradleable body 371 configured to be held in a text entry orientation by an operator or user. (For example see FIGS. 1 and 7). When the body 371 of the handheld wireless communication device 300 is in the open configuration, it has a front face 370 at which a display screen 322 is located and upon which information is displayed to the operator of the handheld device 300 in the text entry orientation. The handheld device 300 further comprises a microprocessor configured to run software programs on the handheld device 300 and to receive operator commands from user inputs, such as a keyboard 332 and trackball navigation tool 321, located on the handheld device 300. The keyboard as shown in FIG. 1 includes a plurality of input keys which can be associated with alphabetic, numeric, or command values. As shown in FIG. 1, the handheld wireless device 300 can include a keypad 650 that is located below the display screen 322 at the front face 370 of the body 371 (when in the open configuration 500) and the keypad 650 comprises a plurality of keys of which a portion are alphanumeric input keys 630. These alphanumeric input keys 630 comprise alphabetic keys 632 which have letters arranged in one of the above described arrangements including but not limited to QWERTY, QWERTZ, AZERTY, and Dvorak arrangements. Furthermore, the arrangement can be of a full arrangement or reduced arrangement as described above, wherein the reduced arrangement has more than one letter associated with at least one key. As shown in FIG. 7, a full QWERTY arrangement is provided on keyboard 332 along with additional numeric, symbol and function keys. A reduced QWERTY arrangement is presented in FIG. 1. Additionally, a navigation tool 327 can be located between the display 322 and the keypad 650 in the text entry orientation.

As described above, it is desirable to provide a handheld electronic communication device 300 with a navigation input device 327. A clamshell handheld communication device 300 according to the present teachings consists of three pieces, a first housing 90 and a second housing 95, which are pivotally coupled one to the other at a hinging interconnector 80. Additionally, a keypad 650 can be located on the first housing 90 and the display screen 322 can be located on the second housing 95. Furthermore, the trackball assembly can be mounted on the hinging interconnector 80. In other embodiments, the navigation input device 327 need not be limited to a trackball assembly—a roller-barrel 331 (see FIG. 11), four-way keypad 341 (see FIG. 12), or other types of navigation input devices are encompassed within the scope of this disclosure.

Figure 10:
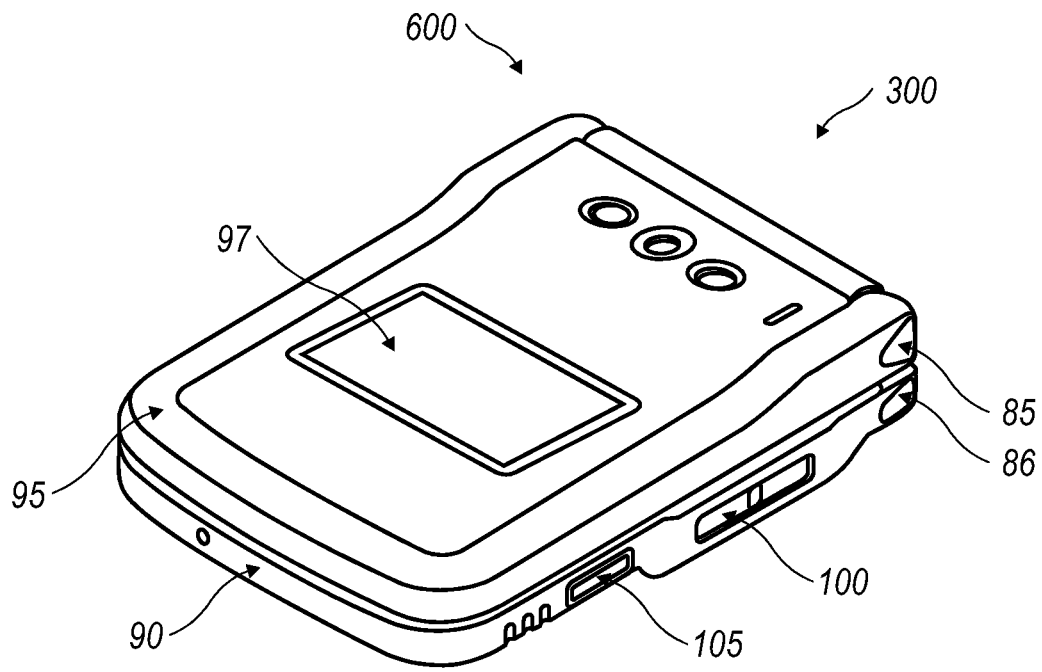
FIG. 10 illustrates a front perspective view of a clamshell handheld wireless communication device in a closed configuration.

A clamshell device is capable of transitioning between an open configuration 500 and closed configuration 600 as illustrated in FIGS. 1 and 10, respectively. In the closed configuration 600, the second housing 95 substantially covers the keypad 650 on the first housing 90. Additionally, when the clamshell handheld electronic communication device 300 is in a closed configuration 600, the trackball 321 is concealed between the first housing 90 and second housing 95. While in the illustrated embodiments the keypad 650 is concealed by the second housing 95, other embodiments of the second housing according to the present teachings may only conceal a portion of the keypad 650 on the first housing 90. In at least one embodiment the keypad 650 covers a substantial entirety of an interiorly exposed surface of the first housing 90. Additionally, in another embodiment the display screen 322 covers a substantial entirety of an interiorly exposed surface of the second housing 95 relative the closed configuration 600. In yet another embodiment, the keypad 650 covers a substantial entirety of an interiorly exposed surface of the first housing 90, and the display screen 322 covers a substantial entirety of an interiorly exposed surface of the second housing 95

The keypad 650 of the first housing 90 can have a variety of different keys each associated with at least one of an alphabetic letter, a numeral, a command and a function. As illustrated in FIG. 1, the first row 200 can include three keys—a left menu selection key 81, a right menu selection key 82, and a "camera" key 83 in the center. The left menu key and right menu key 82 can be used to input a respective function shown on the bottom left and right portions of the display screen 322. For example, in one embodiment, when the clamshell device 300 is in the open configuration 500, the "message" function may be listed on the bottom left of the display screen 322 and the "contacts" function may be listed on the bottom right of the display screen 332. The "message" function is associated with a program that allows a user to enter a messaging application that is capable of creating, sending or editing messages which can include at least one of SMS, MMS, and email. Similarly, the "contacts" function presents a user a listing of names and addresses. According to the present teachings, the user would input the left general menu key 81 to select the "message" function. Likewise, the user would input the right general menu key 82 to select the "contacts" function. In a similar manner, other user selectable functions that appear in the bottom left and right portions of the screen can be selected by the user as described above. In addition, while the general menu selection keys (81, 82) have been described as activating functions shown on the bottom left and right portions of the display screen 322, the functions need not be limited to those particular positions. The center key 83 in the first row 200 is a camera key which allows a user to activate the camera option when using the telephone functionality on the device 300. Other functions known to one skilled in the art may be likewise programmed into the first row 200.

In addition, both the first housing 90 and second housing 95 can have an accommodation space 620 recessed into each housing that receives at least a portion of the trackball 321 when the device 300 is in a closed configuration 600. In this configuration, the hinging interconnector provides a mounting platform for the trackball 321 and the first housing 90 and second housing accommodate for a protruding trackball 321 with the accommodation space 620 in the respective housing. In other embodiments, the accommodation space 620 may be provided only on the first housing 90 or only on the second housing 95.

Additionally, in one embodiment at least one input key may be mounted adjacent the trackball 321 on the hinging interconnector 80. In other embodiments as illustrated by FIGS. 1 and 7, two input keys, each one flanking the trackball 321 on the hinging interconnector 80, may be provided. As discussed previously, the input key immediately to the left of the trackball 321 may be a menu key 606 and the input key immediately to the right of the trackball may be an escape key 608. In yet another embodiment, additional keys may be provided on the hinging interconnector. In one embodiment, the hinging interconnector 80 and the first and second housing (90, 95) have approximately the same width relative the clamshell handheld electronic communication device 300 in the closed configuration 600. In another embodiment, the hinging interconnector 80 has a width approximately one-half the width of either of the first and second housings (90, 95) relative the clamshell handheld electronic communication device 300 in the closed configuration 600. FIGS. 1 and 7 illustrate embodiments in which the hinging interconnector 80 is approximately three-fourth the width of either the first and second housings (90, 95) relative the clamshell handheld electronic communication device 300 in the closed configuration 600. However, hinging interconnectors 80 of various widths, as would be recognized by one skilled in the art, are encompassed within the present disclosure. A microprocessor 338 can be housed within the device 300 and is configured to receive and process input data from the keypad 650 and trackball 321 such that it outputs corresponding display instructional data to the display screen 322.

Figure 8:
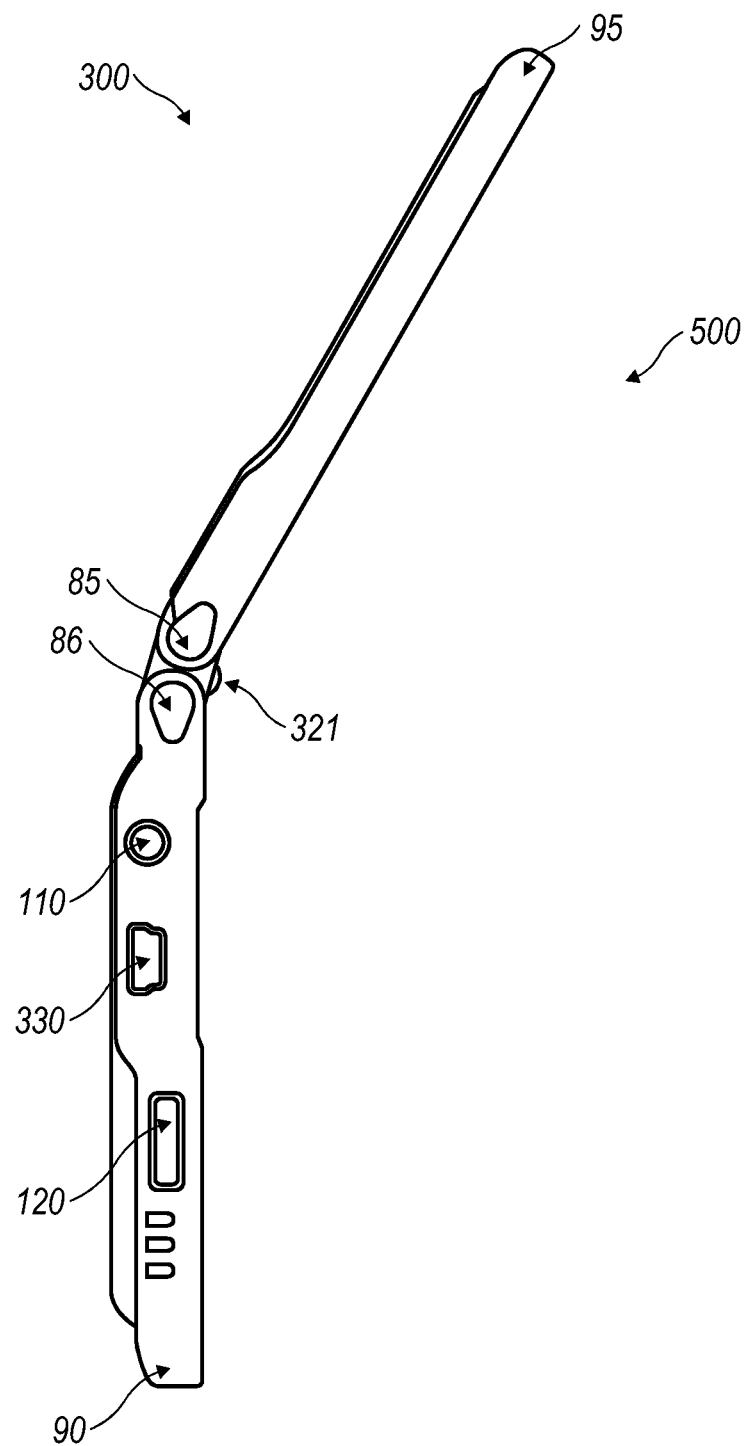
FIG. 8 illustrates a left side view of a clamshell handheld wireless communication device.

FIG. 8 illustrates a side view of the clamshell handheld wireless device 300 in an open configuration 500. From this view, two hinges (85, 86) are visible. These hinges (85,86) connect the first housing 90, second housing 95 and hinging interconnector 80. In one embodiment, only two hinges (85, 86), one which extends through the width of the first housing 90 and one which extends through the width of the second housing 95 are used to hold the housings and hinging interconnector 80 together. However, in another embodiment, four hinges are used, two hinges extend at opposite sides through the second housing 95 and another two hinges which extend at opposite sides through the first housing 90, to hold the first housing 90, second housing 95 and hinging interconnector 80 together. Additionally, FIG. 8 also illustrates an input for the headphone 110, a USB port 330, and a programmable button 120 on the first housing 90.

Figure 9:
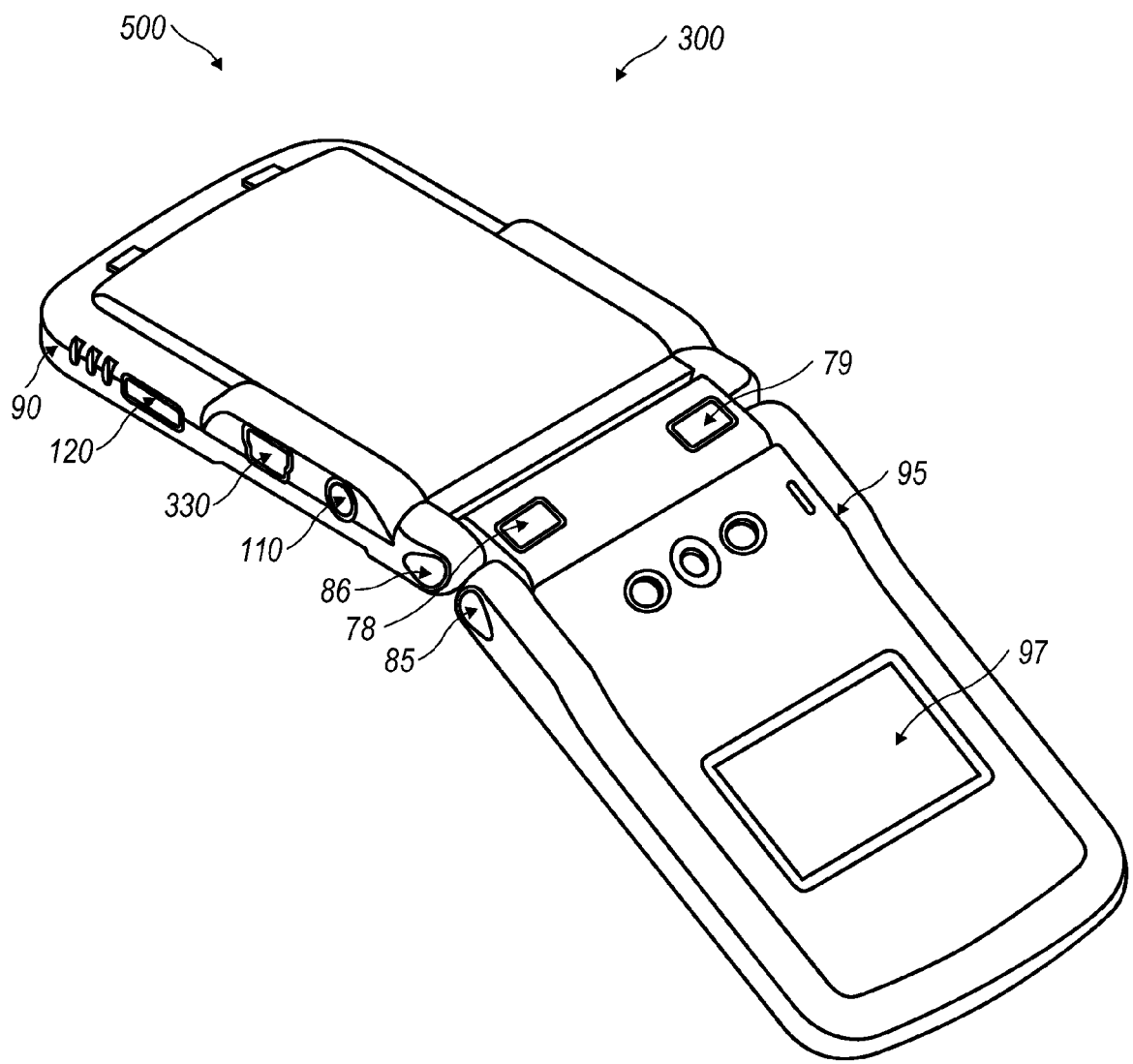
FIG. 9 illustrates a rear perspective view of a clamshell handheld wireless communication device.

FIG. 9 illustrates back perspective view of the clamshell handheld wireless device 300 in an open configuration 500. Likewise, a front display screen 97 (when the device 300 is in the closed configuration 600) which can present the time, date, incoming call information to the user when the device 300 is in the closed configuration 600. On the first housing 90, hinges 86 and 88 (not shown) are found. Likewise, a programmable button 120, USB port 330, an input for headphones 110 are also shown. In addition, on the back of the hinging interconnector 80 are a 'mute/hold' button 78 and a 'pause/play' button 79 for user selection. FIG. 10 illustrates a front perspective view of the clamshell handheld wireless device 300 in a closed configuration 600. On the first housing 90, another programmable button 105 and a volume control button 100 are illustrated. On the second housing 95, the front display screen 97 is shown.

Examplary embodiments have been described hereinabove regarding both handheld wireless communication devices 300, as well as the communication networks 319 within which they operate. Again, it should be appreciated that the focus of the present disclosure is upon the hinging interconnector 80, which connects the first housing 90 and second housing 95 of the clamshell handheld communication device 300.

What is claimed is:

1. A clamshell handheld electronic communication device comprising:
   a first housing and a second housing pivotally coupled one to the other by a hinging interconnector and said handheld electronic communication device transitionable between an open configuration and a closed configuration when said first and second housings are pivoted relative to one another at the hinging interconnector;
   one of said first and second housings having a keypad thereon and the other of said housings having a display screen thereon;
   said interconnector pivotally connected at a first side to said first housing and pivotally connected at a second side to said second housing and said interconnector having a navigational tool mounted thereon, the navigational tool being substantially concealed when the handheld electronic communication device is in the closed configuration; and
   an accommodation space recessed in the front face of at least one of the first housing or the second housing, wherein the accommodation space is configured to receive a raised portion of the navigational tool in the closed configuration.

2. The clamshell handheld electronic communication device as recited in claim 1, wherein said navigational tool is one of a roller-barrel, four-way keypad, joystick, touchpad and trackball assembly.

3. The clamshell handheld electronic communication device as recited in claim 1, wherein said second housing substantially covers the keypad on said first housing in the closed configuration of the device.

4. The clamshell handheld electronic communication device as recited in claim 1, wherein the keypad is located on said first housing and the display screen is located on said second housing.

5. The clamshell handheld electronic communication device as recited in claim 4, wherein the keypad covers a substantial entirety of an interiorly exposed surface of said first housing and the display screen covers a substantial entirety of an interiorly exposed surface of said second housing relative to the closed configuration.

6. The clamshell handheld electronic communication device as recited in claim 4, wherein said second housing has an accommodation space recessed therein that receives at least a portion of the navigational tool in the closed configuration.

7. The clamshell handheld electronic communication device as recited in claim 4, wherein the accommodation space is recessed in the first housing to receive at least a portion of the navigational tool when in the closed configuration.

8. The clamshell handheld electronic communication device as recited in claim 1, wherein at least one input key is mounted adjacent said navigational tool on said hinging interconnector.

9. The clamshell handheld electronic communication device as recited in claim 1, wherein at least two input keys are mounted adjacent to, and each flanking said navigational tool on said hinging interconnector.

10. The clamshell handheld electronic communication device as recited in claim 9, wherein one of said at least two flanking input keys is a menu call button.

11. The clamshell handheld electronic communication device as recited in claim 9, wherein one of said at least two flanking input keys is an escape button.

12. The clamshell handheld electronic communication device as recited in claim 1, wherein said keypad comprises a plurality of alphabetic input keys, each having at least one alphabetic letter associated therewith.

13. The clamshell handheld electronic communication device as recited in claim 12, wherein said alphabetic letters are arranged in one of a QWERTY, QWERTZ, AZERTY, or Dvorak layout.

14. The clamshell handheld electronic communication device as recited in claim 12, wherein a majority of said alphabetic input keys each have more than one alphabetic letter associated therewith.

15. The clamshell handheld electronic communication device as recited in claim 14, wherein said alphabetic letters are arranged in one of a QWERTY, QWERTZ, AZERTY, or Dvorak layout.

16. The clamshell handheld electronic communication device as recited in claim 1, wherein said hinging interconnector and the first and second housings have approximately the same width relative to the clamshell handheld electronic communication device in the closed configuration.

17. The clamshell handheld electronic communication device as recited in claim 1, wherein said hinging interconnector has a width approximately one-half the width of either of the first and second housings relative to the clamshell handheld electronic communication device in the closed configuration.

18. The clamshell handheld electronic communication device as recited in claim 1, further comprising:
a microprocessor housed within the device and configured to receive input data from the keypad and navigational tool, process said input data and output corresponding display instructional data to the display screen.

* * * * *